United States Patent [19]
Rogozinski

[11] Patent Number: 5,269,294
[45] Date of Patent: Dec. 14, 1993

[54] FACE MASK IMPREGNATED WITH ODOR REDUCING MOLECULAR SIEVE MATERIAL

[75] Inventor: Wallace J. Rogozinski, 1087 Lakeview Ter., Azusa, Calif. 91702

[73] Assignee: Wallace J. Rogozinski, Azusa, Calif.

[21] Appl. No.: 887,852

[22] Filed: May 26, 1992

[51] Int. Cl.⁵ .............................................. A62B 7/10
[52] U.S. Cl. ........................... 128/205.27; 128/205.28
[58] Field of Search ..................... 128/205.27, 205.28, 128/204.13

[56] References Cited

U.S. PATENT DOCUMENTS

| | | | |
|---|---|---|---|
| 3,333,585 | 8/1967 | Barghini et al. | 128/204.13 |
| 4,503,851 | 3/1985 | Braunroth | 128/204.13 |
| 4,604,110 | 8/1986 | Frazier | 55/74 |
| 5,012,805 | 5/1991 | Muckerheide | 128/205.28 |
| 5,090,407 | 2/1992 | Lesage et al. | 128/205.28 |

*Primary Examiner*—Edgar S. Burr
*Assistant Examiner*—Aaron J. Lewis
*Attorney, Agent, or Firm*—G. Donald Weber, Jr.

[57] ABSTRACT

An isolation/surgical face mask is treated with an odor absorbing, crystalline, siliceous molecular sieve material in order to reduce gaseous foul odors related to the biological, chemical or microbial decomposition of organic matter beyond the threshold of human sensory perception.

4 Claims, 1 Drawing Sheet

FACE MASK IMPREGNATED WITH ODOR REDUCING MOLECULAR SIEVE MATERIAL

BACKGROUND

1. Field of the Invention

A device to control organic, breathable odors, in general, and a device to be worn on the face of the wearer to reduce breathable odors below human sensory perception, in particular.

2. Prior Art

People afflicted with cancer, chronic urinary or fecal incontinence, non-healing wounds and other necrotic disease processes often express foul odors which are related directly to their physical condition.

Health care professionals attending to or treating such patients are typically faced with the unpleasant task of performing their duties in an environment where patient generated odors range from disagreeable to nauseating. Air fresheners, room sprays and deodorants do not provide either rapid or complete odor control when used to counteract these types of organic odors. More importantly, air sprayers may adversely affect a debilitated or a respiratory compromised patient and, therefore, they must be applied with extreme caution.

Face masks are known in the art. However, the known masks are generally utilized to reduce the inhalation or exhalation of airborne germs, bacteria and the like. These masks are, generally, intended merely as particulate filters.

Chemical odor traps, e.g. molecular sieves, are also known in the art. These odor traps are, generally, applied in powder form to the odor producing area to absorb the gas-borne odor. Even when these odor traps are utilized, a certain amount of odor is released into the ambient before the traps take effect.

SUMMARY OF THE INSTANT INVENTION

A porous material such as an absorbent paper or fabric is impregnated with a chemically modified molecular sieve in concentrations ranging from 10% to 50% w/w. The chemically treated material is laminated onto a standardly-configured surgical or isolation face mask. Alternatively, the material is incorporated into a formed paper cone face mask. The mask reduces the perception of odoriferous materials by the wearer thereof in ordinary breathing processes.

PRIOR ART STATEMENT

The following patents are related to the technology of the invention described herein.

U.S. Pat. No. 3,789,797 is directed to a mixture of alfalfa, bentonite clay and a binder for absorbing odors of animal waste matter.

U.S. Pat. No. 4,437,429 is directed to the use of a hydrated zeolite in an admixture with clay used to control odors from pet litter.

U.S. Pat. No. 4,604,110 is directed to a mixture of silica gel, activated carbon and a zeolite as an odor absorbent for an air filter.

U.S. Pat. No. 4,648,977 is directed to the use of high-silica molecular sieves to absorb toxic organic materials from aqueous media for water purification purifiers.

U.S. Pat. No. 4,795,482 is directed to a process for eliminating organic odors and compositions for use therein.

DESCRIPTION OF A PREFERRED EMBODIMENT

Figure 1:
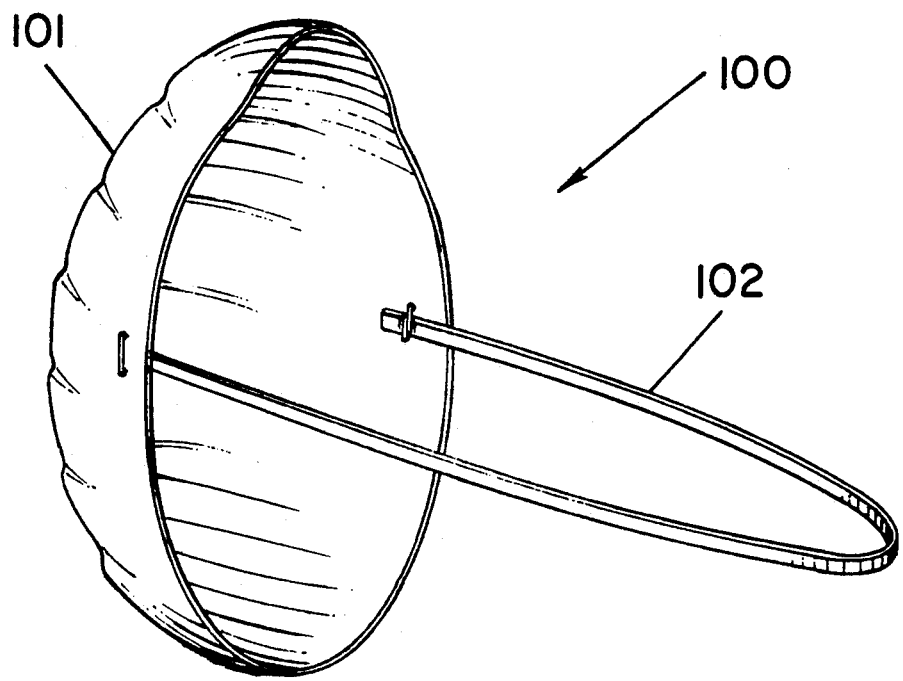
FIG. 1 is a representation of a face mask as, for example, worn by a medical practitioner.

Referring now to FIG. 1, there is shown a representation of a face mask 100 produced in accordance with the instant invention. The mask 100 includes a face portion 101 which covers the mouth and nose of the wearer (not shown). The straps 102 are affixed to the edges of the face portion 101. The straps extend around the back of the head of the wearer. The straps 102 can be elastic (for stretching) or cloth (for tying) at the back of the wearer. Of course, any type of restraint can be used with the invention.

In application, the face portion 101 can be a cone-formed paper or non-rigid cloth face mask. The mask is, generally, of a design typically employed by physicians and nurses in the surgical suite or hospital setting. In this invention, the face portion 101 has been wholly integrated with a paper or composite material that has been previously impregnated with a 10 to 50% concentration of an organic odor absorbing molecular sieve. In use, the face portion is placed over the nose and mouth of the wearer. During normal inhalation through the composite face mask, organic gaseous compounds are absorbed by the crystalline molecular sieve and thereby eliminated from the air that is breathed through the mask. Thus, ambient odor control (as perceived by the wearer) is achieved.

In the instant invention, the chemically modified molecular sieve is described as a sodium potassium alumino silicate. This sieve conforms, generally, to the composition of zeolites such as: $Na_2O.AL_2O_3.XSiO_2.XHOH$ or more specifically: $Na_2O,K_2O,AL_2O_3, SiO_2$. This example is merely intended to indicate one type of sieve which is functional and is not intended to be limitative of the invention. A suitable molecular sieve powder is distributed commercially by UOP, Old Saw Mill River Road, Tarrytown, N.Y. 10591 under the registered trademark ABSCENTS and covered by U.S. Pat. No. 4,795,482.

Sodium potassium alumino silicate has the ability to absorb noxious odors associated with cancer, incontinence, necrotic tissue and infection, as well as the gaseous by-products of microbial decomposition. The porous crystalline internal structure of this molecular sieve has been rendered organophilic and, as a consequence, exhibits a strong bias for odor producing compounds. Malodorous gases are, therefore, attracted to and subsequently absorbed and trapped within the central core of the molecular sieve's complex structure.

As noted, the face portion 101 is impregnated with the molecular sieve of the type noted above. (Obviously, other similar molecular sieves can be utilized in the invention.) This can be accomplished by the simple expedient of soaking the mask material in the molecular sieve as an aqueous solution thereof. The mask is then permitted to dry (if necessary) and forms the impregnated face portion 101.

Of course, other techniques can be utilized. For example, the molecular sieve material can be forced into the mask material by pressure, under a temperature requirement or the like.

In the case of the paper mask, the molecular sieve can be included in the manufacture of the paper pulp, if so desired.

Figure 2:
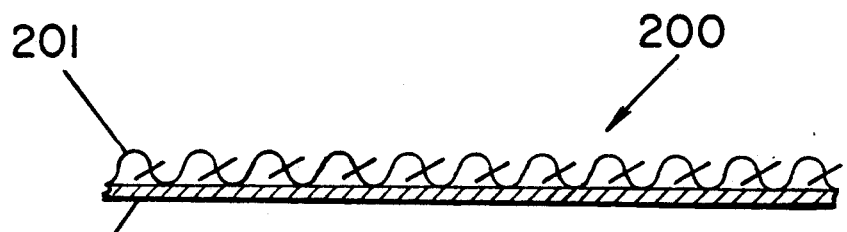
FIG. 2 is a cross-sectional view through a portion of the face mask shown in FIG. 1.

Referring to FIG. 2, there is shown a cross-sectional view of a portion 200 of a mask made in accordance with the instant invention. Thus, a basic layer 201 mask material can be provided. The molecular sieve can then be applied to and impregnated into a cloth or paper fabric layer 202. The layers 201 and 202 are joined together by a suitable adhesive to form the face portion 102 of the mask. Of course, multiples of either layer can be provided, if desired.

Suggested areas of use include cancer wards, nursing homes, hospitals, surgical suites, pathology, necropsy, morgues, patients with necrotic disease processes, chronic fecal or urinary incontinence, animal kennels and sanitation services.

Thus, there is shown and described a unique design and concept of an isolation/surgical face mask. The particular configuration shown and described herein relates to a device treated with an odor absorbing material in order to reduce breathable odors below human sensory perception. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. An odor reducing mask comprising, a layer of porous material impregnated with an odor absorbing material, said odor absorbing material comprises a 10% to 50% concentration of an organic molecular sieve, said odor absorbing material is formed of a chemically modified molecular sieve formed of a composition of zeolites, a support layer mounted to said layer of porous material in order to provide support therefor, said support layer is formed in the shape of a cone thereby to provide a face mask to cover the nose and mouth of a wearer, and attaching means joined to at least one layer of said mask in order to selectively mount said mask to a wearer.

2. The mask recited in claim 1 wherein, said porous material is comprised of paper.

3. The mask recited in claim 1 wherein, said odor absorbing material is a sodium potassium alumino silicate.

4. The mask recited in claim 1 wherein, said porous material is comprised of fabric.

* * * * *